United States Patent [19]

Kobayashi

[11] Patent Number: 4,887,496
[45] Date of Patent: Dec. 19, 1989

[54] METHOD OF MAKING DRILLS, ENDMILLS AND OTHER ROTATING-AND-CUTTING TOOLS

[76] Inventor: Yoshinobu Kobayashi, 2047 Shimotsuruma, Yamoto-shi, Kanagawa-ken, Japan

[21] Appl. No.: 247,394

[22] Filed: Sep. 21, 1988

[30] Foreign Application Priority Data

Mar. 7, 1988 [JP] Japan .................................. 63-53262
Jun. 9, 1988 [JP] Japan ................................ 63-141981

[51] Int. Cl.⁴ .......................... B23P 15/28; B22F 7/00
[52] U.S. Cl. ........................... 76/108 R; 76/DIG. 11; 419/5; 419/25; 419/41
[58] Field of Search ............. 76/108 R, 108 T, 101 R, 76/DIG. 11; 419/5, 6, 8, 25, 30, 36, 41, 42

[56] References Cited

FOREIGN PATENT DOCUMENTS

| 56325 | 11/1912 | Fed. Rep. of Germany .... 76/108 T |
| 962884 | 12/1949 | France .............................. 76/108 T |
| 134129 | 6/1988 | Japan ................................ 76/108 R |
| 1161863 | 8/1969 | United Kingdom ............ 76/108 R |

Primary Examiner—Roscoe V. Parker
Attorney, Agent, or Firm—Cushman, Darby & Cushman

[57] ABSTRACT

Disclosed is a method of making drills, endmills and other rotating-and-cutting tools comprising the steps of: extruding super-hard metal powder into a spiral rod; sintering the spiral rod; forming a-ferrous metal powder layer around the rear end of the spiral rod sinter; and heating and then cooling the ferrous metal powder layer in such a way that voids may be caused to appear in the ferrous metal powder layer, which is integrally connected to the spiral rod sinter to make up its shank. Thanks to the existence of the voids in the shank layer, any inner strain will be dissipated, assuring that crack-free products result.

9 Claims, 8 Drawing Sheets

4,887,496

METHOD OF MAKING DRILLS, ENDMILLS AND OTHER ROTATING-AND-CUTTING TOOLS

BACKGROUND OF THE INVENTION

1. Field of the Invention

The present invention relates to a method of making super-hard tools, and more particularly a method of making drills, endmills and other rotating-and-cutting tools. A method of making super-hard tools according to the present invention has a central feature in providing a super-hard tool body with a shank. The super-hard tool body is made by extrusion and sintering.

2. Description of Prior Art

As is well known, drills, endmills, reamers, or taps have different blades appropriate for the purpose, but in common, they have a straight or tapered shank at one end and a blade along the remaining length. These tools can be fixed to associated holders or chucks at their shanks. The sufficient coarsness and hardness are required for the finished surface of the shank, and at the same time, it is required that the shank be integrally connected to the blade part of the tool. In making drills, endmills, reamers, or taps, first, a super-hard rod is prepared, and the bar is cut a predetermined length. Then, a part of the predetermined length of bar is edged with the aid of diamond tool, leaving the remaining length as a shank.

This ensures that the shank is integrally connected to the edged part of the tool, and accordingly the life of such tools is extended. The manufacturing cost, however, is very high partly because of the use of diamond tools and partly became of precision and complicatedness required in providing supper-hard bars with edges or blades. The conventional method of making super-hard rotating-and-cutting tools cannot meet the demand for reduction of manufacturing cost. In an attempt to meet such demand the applicant proposed that: an appropriate additive is added to pulverized super-hard alloy; the powder is extruded into a spiral form; the spiral form is sintered; and then the sintered spiral tool body is provided with a shank at its end by: (1) inserting one end of the sintered spiral tool body in a ferrous metal cylinder and then, brazing the tool body to the cylinder; (2) filling the spiral groove of the sintered spiral tool body with a melted metal, and cool and solidify the melted metal in the spiral groove; or (3) applying pulverized ferrous metal to one end of the sintered spiral tool body with its spiral groove filled with the metal powder, and then shaping and sintering the ferrous metal covering.

This permits efficient and easy production of drills, endmills and other super-hard rotating-and-cutting tools without difficulty, but the method has following defects:

There is a great difference between thermal expansion or contraction of the sintered tool body and that of the shank, which is made of a ferrous metal. For instance, the thermal expansion or contraction of a super-hard metal powder sinter is assumed to be 1, and then that of a ferrous metal is about 2.2. In this connection if a sintered tool body provided with a shank is subjected to heating and cooling without extra remedy, there will appear a great strain between the sintered body and the shank layer. In fact, the sintered body is stretched to the shank until there appears cracks in the sintered body. Therefore, the method proposed by the applicant is difficult to be practices unless this problem is solved.

SUMMARY OF THE INVENTION

With the above in mind one object of the present invention is to provide a method of making drills, endmills and other rotating-and-cutting tools with an increased efficiency at a reduced cost.

Another object of the present invention is to provide a method of making crack-free or complete drills, endmills and other rotating-and-cutting tools having an increased strength.

To attain these objects a method of making drills, endmills and other rotating-and-cutting tools, in which super-hard metal powder is extended into a spiral form, and the spiral form is sintered, is improved according to the present invention in that it compries the steps of: forming a ferrous metal powder layer around a part of the sintered spiral from with its spiral groove filed with the ferrous metal powder; and heating and then cooling the ferrous metal powder layer to form a shank integrally connected to the spiral sintered body, cooling being performed so as to permit the ferrous metal powder layer to solidify with voids appearing inside, not having the inside completely filled up, thereby permitting such voids to absorb any strain, which otherwise, would be caused by the difference between the thermal expansion or contraction of the shank and that of the sintered spiral body.

Preferably, the step of forming a ferrous metal powder layer around a part of the sintered spiral form with its spiral groove filled with the ferrous metal powder, includes the steps of: applying the ferrous metal powder to the part of the sintered spiral form, and applying a pressure to the ferrous metal powder layer to form the shank layer; and the step of heating and then cooling the ferrous metal powder layer to form a shank integrally conected to the spiral sintered body, includes the step of sintering the ferrous metal powder layer so as to cause voids to appear inside, thereby permitting such voids to absorb any strain, which otherwise, would be caused by the difference between the thermal expansion or contraction of the shank and that of the sintered spiral body.

The step of forming a ferrous metal powder layer around a part of the sintered spiral form with its spiral groove filled with the ferrous metal powder may include the steps of: preparing a ferrous metal pipe whose size is large enough to allow the sintered spiral form to be inserted loosely; inseting a part of the sintered spiral form in the pipe; filling the spiral groove of the part of the spiral sintered form and the annular space between the pipe and the sintered spiral form with a ferrous metal; and impregnating the packed ferrous metal with a brazing material by capillary action. The step heating and then cooling the ferrous metal powder layer to from a shank integrally connected to the spiral sintered body may include the steps of: heating the pipe and the part of the sintered spiral form at a temperature at which the brazing material will be melted, thereby melting and then soldifying the brazing material. Then, voids are caused to appear inside to absorb any strain, which otherwise, would be caused by the difference between the thermal expansion or contraction of the shank and that of the sintered spiral body.

In forming a super-hard metal sinter body having a shank integrally connected thereto, that is, in sintering or brazing the shank to the sinter body, there will be caused a contraction strain between the sinter body and the shank layer due to the difference between the expansion or contraction of the sinter body and that of the shank. Spacifically, the sinter body will be stretched to the shank layer in cooling. The existence of voids in the shank layer will absorb the contraction strain to prevent the sinter body from cracking. Thus, a crack-free, complete sinter tool results. Also, it should be noted that a part of the shank body constitutes the core of the overlying shank, thereby assuring the good strength with which the shank can resist the force with the tool is fixed to an associated holder or chuck.

Other objects and advantages of the present invention will be understood from the following description of preferred embodiments, which are shown in the accompanying drawings:

FIG. 1 is a chart showing subsequent steps in making a rotating-and-cutting tool;

FIG. 2 is a side view of a spiral extrusion;

FIG. 3 is a side view of a sintered rod;

FIG. 4 is a side view of a sintered tool body;

FIG. 5 is a longitudinal sectional view illustrating how ferrous metal powder is sintered to from a shank;

FIG. 6 is a side view of a sintered form having ferrous metal layer at one end thereof;

FIG. 7 is a side view of a sintered form having ferrous layer sintered to one end thereof;

FIG. 8 is a side view of the sintered from of FIG. 7, showing its sintered ferrous metal layer in section;

FIG. 9 is a sketch showing voids appearing in the sintered ferrous metal layer or shank;

FIG. 10 is a side view of a rotating-and-cutting tool with coolant channels;

Figure 11:
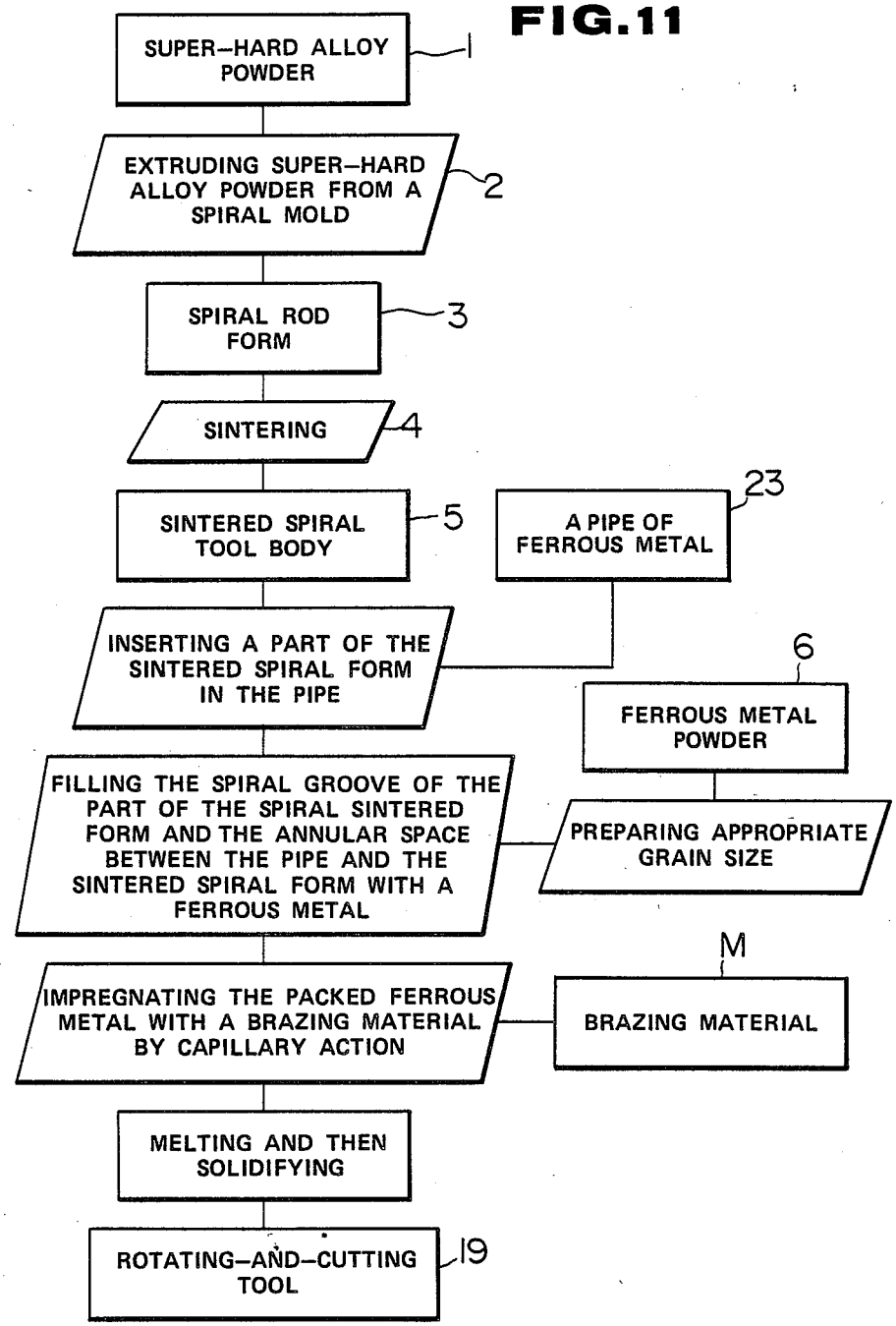
Figure 12:
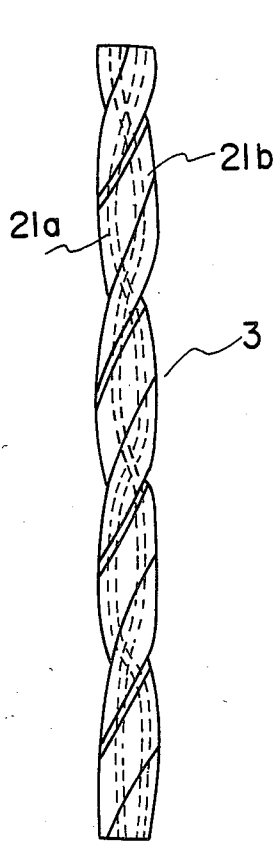
Figure 13:
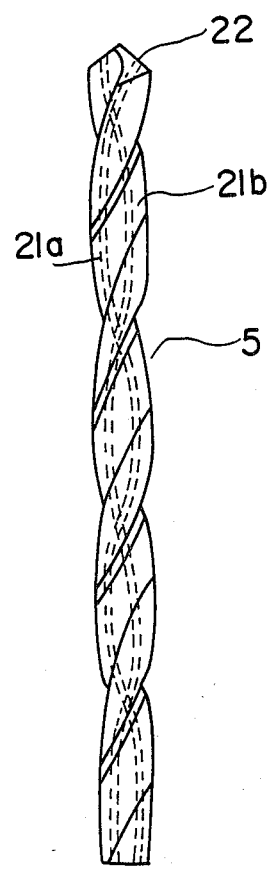
Figure 14:
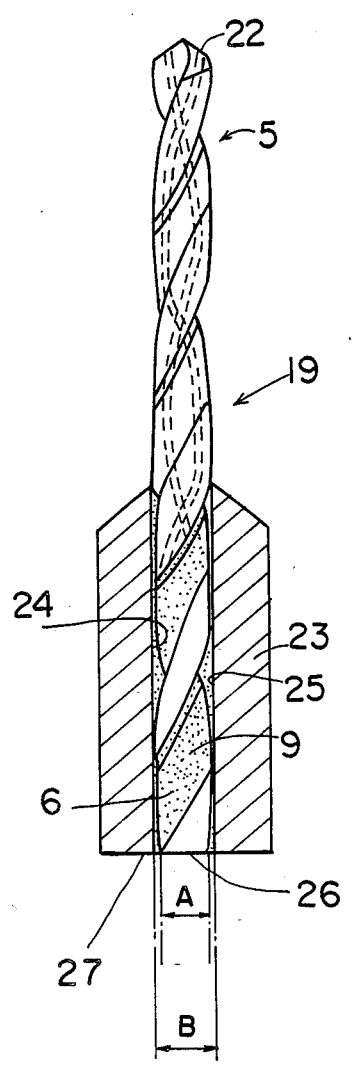
Figure 15:
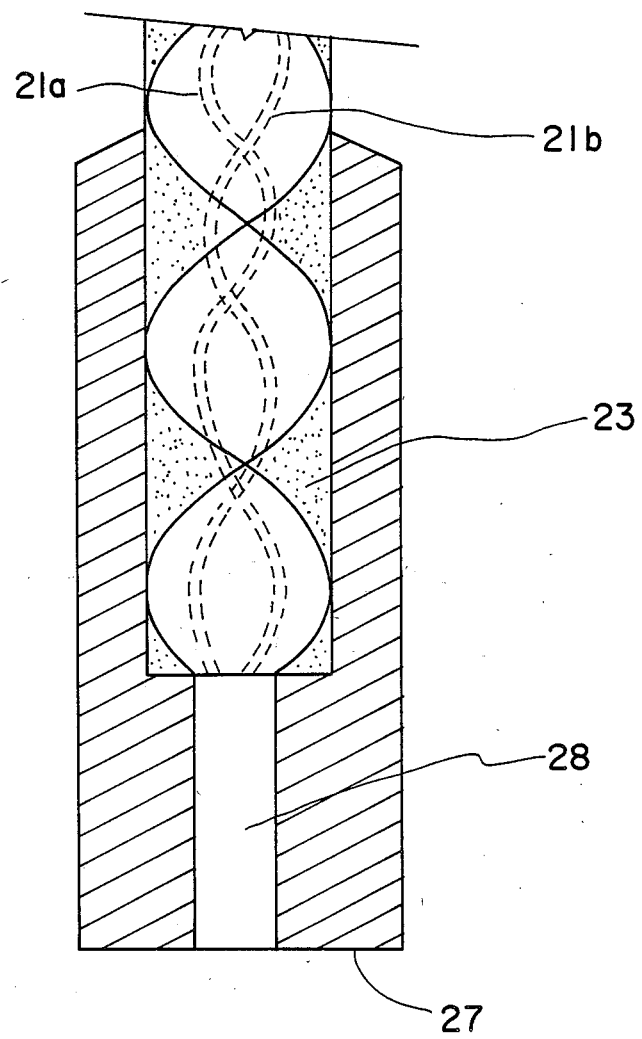

FIGS. 11 to 15 show a second embodiment in which ferrous metal powder is packed in the annular space between a spiral sinter and a pipe enclosure; the packed ferrous metal powder is impregnated with a brazing metarial by capillary action; and the pipe is subjected to heating at the temperature at which the brazing material is melted, thereby permitting the surrounding ferrous metal to be brazed and integrally connected to the spiral tool body;

FIG. 11 is a chart showing subsequent steps;

FIG. 12 is a side view of an extruded form;

FIG. 13 is a side view of a sintered form;

FIG. 14 shows a sintered tool form having a ferrous metal pipe shank brazed and integrally connected to the tool body;

FIG. 15 is partly sectional, enlarged view illustrating a sintered tool form having a ferrous metal pipe shank brazed and integrally connected to the tool body, the tool body shown as extending short of the bottom end of the pipe.

DESCRIPTION OF PREFERRED EMBODIMENT

Figure 1:
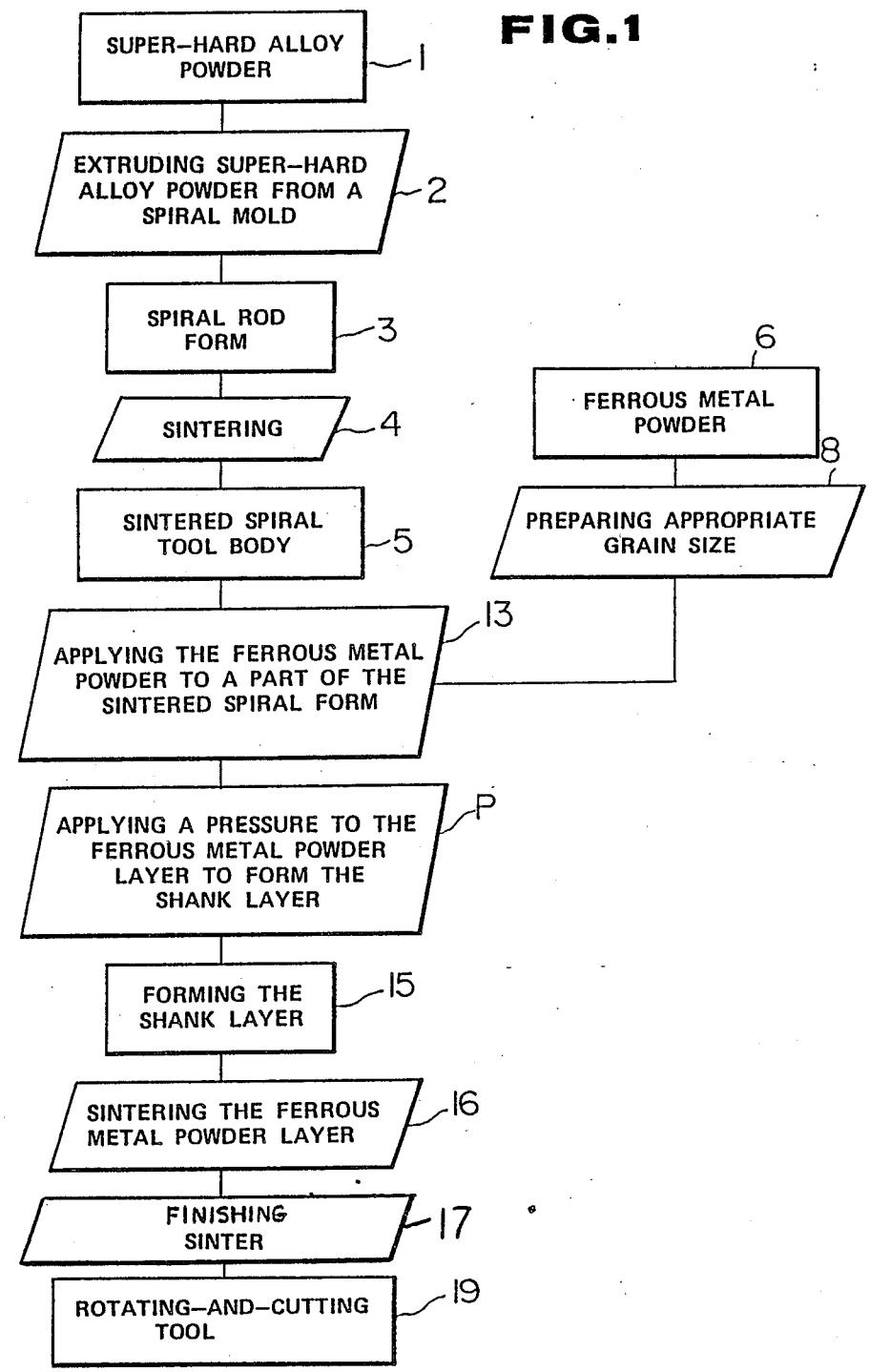
FIGS. 1 to 10 show a first embodiment in which a ferrous metal layer is sintered to a drill bit sinter body to form its shank.
Figure 2:
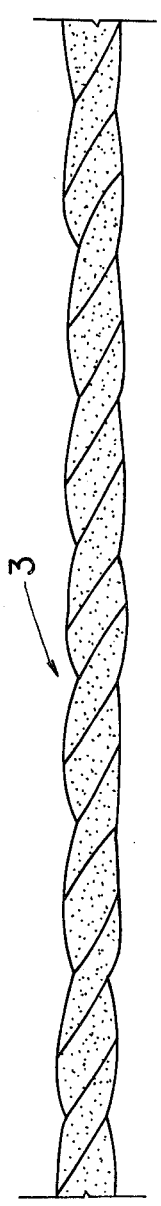
Figure 3:
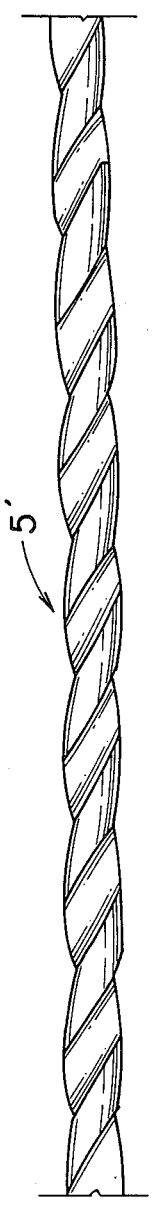
Figure 4:
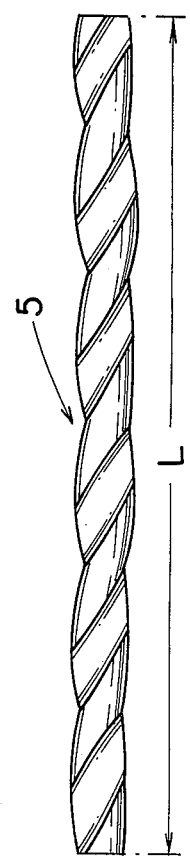
Figure 5:
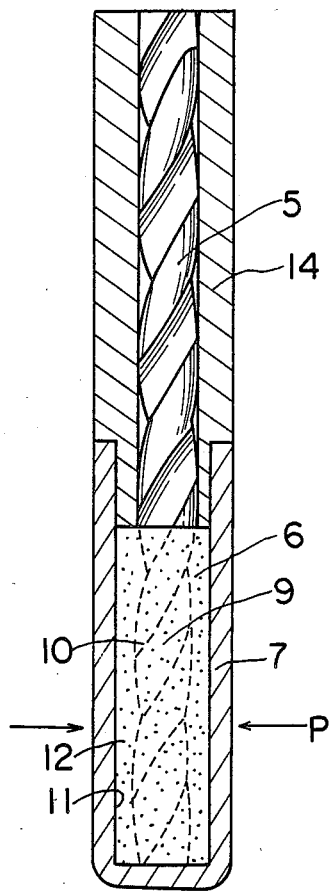
Figure 6:
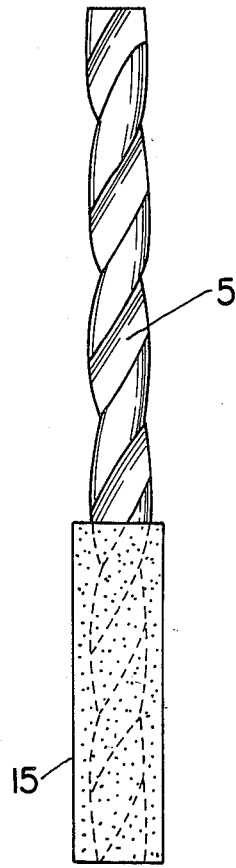
Figure 7:
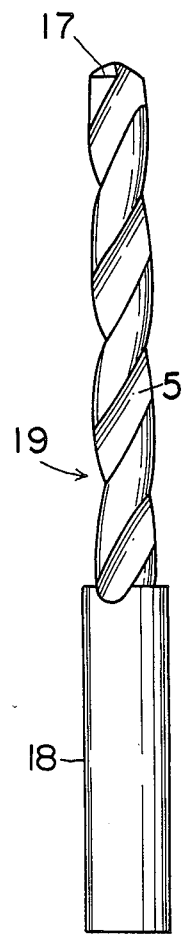
Figure 8:
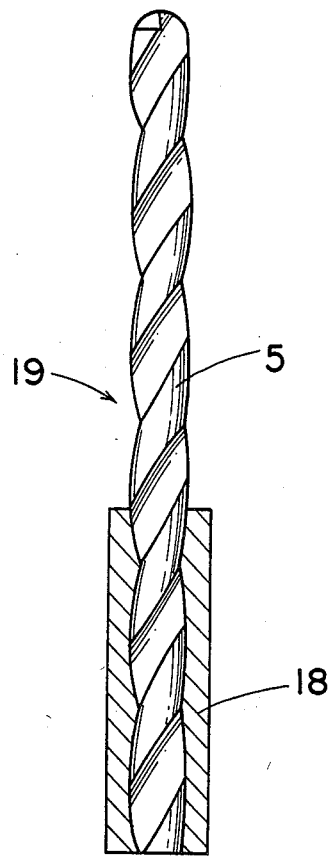
Figure 9:
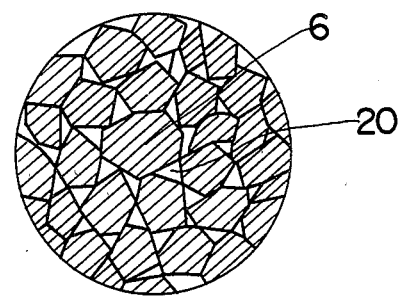

First, referring to FIGS. 1 to 15, super-hard alloy powder of appropriate granularity and an additive are mixed together, and then the mixture granularity and an additive are mixed together, and then the mixture is extruded from a spiral mold (See step 2 in FIG. 1). Thus, a spiral rod form results (See step 3 in FIG. 1). As a matter of course, pitch or blade-to-blade space must have a shape and size as appropriate for the purpose or use. Then, the spiral rod form is sintered at the temperature at which the super-hard metal is sintered. Thus, a sintered spiral tool body 5' esults (See step 4 in FIG. 1). An elongated spiral rod 5' may be first made, and then it may be cut a desired short length 5. Some examples of such super-hard metal are: alloys of WC-Co; WC-Ni; WC-TaC-TiC-Ni, or cermit, which is prepared by mixing powders of oxides, carbides, silicides, borides or nitrides of metals of Group N, V and N of the period table and cobalt, nickel, iron and other metal powder, and by sintering the mixture in vacuum or protecting gasous atmosphere.

A unitay length of sintered spiral form L is partly inserted in a rubber hollow cylinder 7, thereby encicling the part of the spiral form which is to be provided with a shank. Then, pulverized ferrous metal 6 is packed in the spiral groove 9 of the sinter body and in the annular space 12 between the thread surface 10 of the sinter body 5 and the inner surface 11 of the hollow cylinder 7 (See step 13 in FIG. 1). A jig 14 is applied to the substantial length of the spiral form. Pressure P is applied to the rubber cylinder 7 to form a shank layer 15. Then, the shank layer 15 is sintered (See step 16 in FIG. 1), and the sinter is finished (See step 17 in FIG. 1). Thus, a rotating-and-cutting tool 19 provided with a shank results.

So far a conventional extruding-and-sintering method is described, and the feature of the present invention resides in that voids 20 are caused to appear in a shank 18 of sintered ferrous metal powder, not having the inside completely 100 percent filled up. The rate of void spaces to the inside of the shank layer is selected to be enough to allow the voids to absorb an inner strain which otherwise, would appear in sintering the ferrous metal powder layer 15 to the sinter tool body 5 owing to the difference between the thermal expansions or contractions of these different metals. Whether or not the appropriate void rate on content is obtained, depends on powder size or granularity of pulverized ferrous metal, pressure and sintering temperature. Specifically, the proper selection of granularity is a direct function of void content. The void content will decrease with the increase of forming pressure, and will decrease with the rise of sintering temperature. Therefore, these factors must be carefully selected to attain the desired void content. An appropriate void content can be determined cut-and-try initially, and after that it is preferably determined on the basis of theoretical factors. Some selected pulverized super-hard metals of different compositions were sintered at different temperatures under different pressures, and some selected pulverized ferrous metals were applied and sintered to the resultant sinters at different temperatures under different pressures. The resultant samples were cut to scrutinize whether or not any crack appeared inside. Thus, crack-free samples were selected, and then the manufacturing conditiones were determined in terms of compositions, granularities, sintering pressure and temperature and other factors. Also, the void content was determined as ranging from 92% to 95%, preferably 93%. After that a plurality of shanked sinter tools were made on the manufacturing conditions thus determined. Almost all the resultant sinter tools were found to be good in quality, suggesting that consistent products be made at an increased efficiency. This is attributable to the existence of voids in the sintered forrous metal shank 18 around the spiral shank tool body 5, thereby allowing the pulverized ferrous metal layer 15 to expand and constrict largely compared with the sinter tool at the sintering and cooling steps. Therefore, there is no possibility of appearance of any cracks in the spiral sinter tool body. The voids in the shank enclosure have an effect of absorbing and reducing inner strain if any, which inner strain would be, otherwise, caused by the difference between the thermal expansion or constriction of the spiral shank tool body and that of the shank enclosure. Spiral tool bodies are made by extrusion, and therefore they can be made at an increased efficiency, and also advantageously the manufacturing cost is relatively low. The shank has a sinter body as its core, and therefore it is stout enough.

Some examples are given in the following:

EXAMPLE 1

WC powder of 92 percent by weight and Co powder of 8 percent were mixed, and the super-hard alloy powder was extruded into a spiral form. The resultant spiral form was sintered. Thus, a drill bit sinter body resulted.

A part of the drill bit sinter body was put in a rubber cylinder, and then the spiral groove and the annular space between the surface of the drill bit body and the inner surface of the cylinder were packed with iron powder (100 or more mesh-powder of 80% and 100 to 30 mesh-powder of 20%). Then, the encircling rubber cylinder was subjected to a static hydraulic pressure of 2t/cm2. Then, the drill bit sinter body having an iron powder layer surrounding its terminal length, was subjected sintering. The resultant drill bit was cut at its shank. No crack appeared inside. The void content was about 93%.

The inner strain due to the constriction of the composite sinter body when cooled, seemed to be absorbed and reduced by void spaces.

EXAMPLE 2

A drill bit was made in the same way as the above example except that shank-shaping pressure was 2.3t/cm2. The void content was about 93.2%. No crack appeared inside.

EXAMPLE 3

A drill bit was made in the same way as Example 2 except that sintering temperature was 1310 degrees Centigrade. The void content was about 96%. Only a few cracks appeared inside. The void content was not sufficient enough to absorb and reduce the inner strain, and therefore the remaining inner strain had an effect to pull the drill bit body surface towards the shank, thus causing cracks to appear inside. The remedy is lowering of the sintering temperature, reduction of shank-forming presure or use of ferrous metal powder of different granularities.

EXAMPLE 4

A drill bit was made in the same way as Example 1 except that shank-shaping pressure was 1.9t/cm2. The void content was about 91%. No crack appeared inside. There is, however, a fear of shortage of strength even though the sinter drill bit body functions as a reinforcing core, and therefore it is desirable to increase the void content somewhat.

In the examples given above, pulverized ferrous metal was packed into the spiral groove 9 of the sinter drill bit body 5 and the annular space between the drill bit surface and the inner surface of the rubber enclosure, thereby forming a pucked metal powder shank layer 15. Sometimes, it may suffice that pulverized ferrous metal is packed into the spiral groove 9 only by using a special pressing method which is different from the one used in the above examples.

Figure 10:
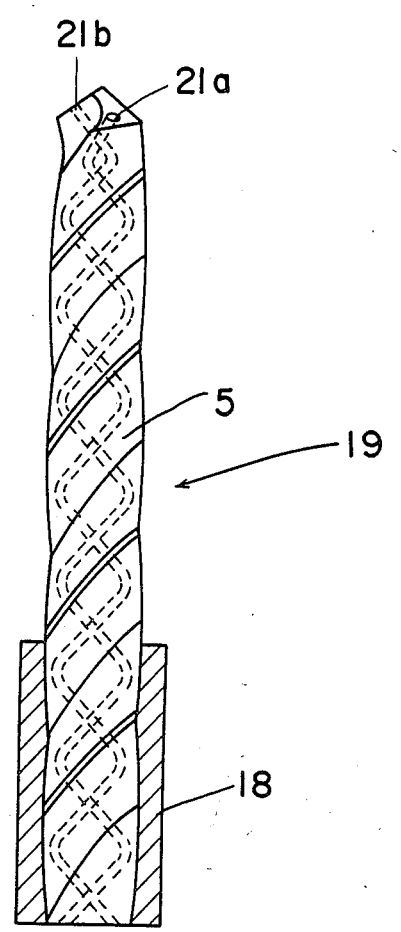

The pulverized ferrous metal layer may be impregnated with brazimg material by capillary action, and then the shank layer may be sintered. Then, the brazing material will function as binder. As shown in FIG. 10, a spiral extrusion 5 may be provided with coolant channels 21a and 21b, and then the spiral extrusion having coolant channels formed therein may be sintered into a spiral drill bit body, which is later provided with a shank 18. These sprial coolant channels 21a and 21b can be automatically formed by extruding pulverized metal through a spiral extrusion mold having two upright pins.

FIGS. 11 to 14 show a drill bit body according to a different embodiment of the present invention.

First, WC-Co metal powder of appropriate grain size prepared and if occasions demand, any additive may be added. A spiral extrusion mold having two upright pins at a predetermind interval, is used. A spiral extrusion having two spiral coolant channels, 21a and 21b formed therein results from extrusion of the super-hard metal powder through the spiral extrusion mold provided with upright pins.

Then, the spiral extrusion is sintered (See step 4). The spiral sinter body is subjected to finishing, such as pointing as indicated at 22. Thus, a drill bit body 5 results. On the other hand, a pipe of ferrous metal 23 is prepared. The pipe 23 has a circular hollow space 24 of a diameter B large enough to allow the drill bit body A to be inserted loosely. Pulverized metal 6 is packed into the spiral groove 9 and the annular space between the drill bit body surface and the inner surface 25 of the pipe 23. Then, for the purpose of fixing the drill bit body to the pipe by brazing, the packed metal powder layer is impregnated with brazing material M by capillary action. It should be noted that the ferrous metal of the shank layer should not be melted into liquid phase to fill its voids with melted ferrous metal when the shank layer is heated at a temperature at which the brazing material M is melted. Specifically, the melting temperature of brazing material must be lower than the melting temperature of the ferrous metal, of which the shank layer is formed. A drill bit object 19 having a pipe 23 integrally connected to the drill bit body 5 results.

As may be perceived, the material of the drill bit body 5 is different from that of the pipe 23. Therefore, the thermal expansion and contraction of the drill bit body is different from that of the pipe, and accordingly the inner strain will appear in the vicinity of the interface at which the drill bit body is brazed to the pipe. Such inner strain, however, will be absorbed by the voids 20 in the pulverized ferrous metal layer.

In this particular example the rear end 26 of the drill bit body 5 is flush with the rear end 27 of the pipe 23, thus permitting the coolant channels 21a and 21b to open at the rear end of the assembly structure. As shown in FIG. 15, the drill bit body may reach short of the rear end 27 of the pipe so that the coolant channels 21a and 21b may open to a single coolant channel 28 of relatively large diameter, which is formed in the rear part of the pipe.

As is apparent from the above, a rotating-and-cutting tool making method according to the present invention uses essentially sintering of super-hard metal powder extrusion into a desired from. This permits efficient and inexpensive production of rotating-and-cutting tools, and hence marketting the preduced at a reduced price.

The central feature of the present invention resides in causing voids to appear in the pulverized ferrous metal layer, thereby dissipating any inner strain appearing the vicinity of the interface between the drill bit body and the ferrous metal layer in sintering and cooling these different parts into integration. Thanks to voids in the ferrous layer, no crack appears in the product. Also, the shank layer is stout enough because of reinforcement provided by its drill bit core.

I claim:

1. A method of making drills, endmills and other rotating-and-cutting tools comprising the steps of: extruding super-hard metal powder into a spiral form; and sintering the spiral form, characterized in that it comprises steps of:
   forming a ferrous metal powder layer around a part of the sintered spiral form with its spiral groove filled with the ferrous metal powder; and
   heating and then cooling the ferrous metal powder layer to form a shank integrally connected to the spiral sintered body, cooling being performed so as to permit the ferrous metal powder layer to solidify with voids appearing inside, not having the inside completely filled up, thereby permitting such voids to absorb any strain, which otherwise, would be caused by the differece between the thermal expansion or contraction of the shank material and that of the sintered spiral body.

2. A method of making drills, endmills and other rotating-and-cutting tools according to claim 1 wherein the step of forming a ferrous metal powder layer around a part of the sintered spiral form 5 with its spiral groove 9 filled with the ferrous metal powder, includes the steps of: applying the ferrous metal powder 6 to a part of the sintered spiral form 5, and applying a pressure to the ferrous metal powder layer to form the shank layer 15; and
   the step of heating and then cooling the ferrous metal powder layer to form a shank 18 integrally connected to the spiral sintered body 5, includes the step of sintering the ferrous metal powder layer so as to cause voids 20 to appear inside, thereby permitting such voids to absorb any strain, which otherwise, would be caused by the difference between the thermal expansion or contraction of the shank material 18 and that of the sintered spiral body 5.

3. A method of making drills, endmills and other rotating-and-cutting tools according to claim 2 wherein a part of the sintered spiral form 5 is fully covered by the ferrous metal powder layer with its spiral groove 9 filled with the ferrous metal powder, not exposing the spiral blade of the part of the sintered spiral form to form a shank layer.

4. A method of making drills, endmills and other rotating-and-cutting tools according to claim 2 wherein only the spiral groove 9 of a part of the sintered spiral form 5 is fully filled with the ferrous metal powder to from a shank layer 15.

5. A method of making drills, endmills and other rotating-and-cutting tools according to claim 2 wherein the step of applying a pressure to the ferrous metal powder layer to from the shank layer 15 includes the steps of:
   inserting the part of the sintered spiral body 5 in a rubber cylinder 7;
   filling the annular space between the sintered body and the rubber cylinder with the ferrous metal powder 12; and
   applying a hydraulic pressure to the rubber cylinder 7 to from a shank layer.

6. A method of making drills, endmills and other rotating-and-cutting tools according to claim 2 wherein the shank layer 15 of the ferrous metal powder 6 is impregnated with a brazing material by capillary action prior to sintering.

7. A method of making drills, endmills and other rotating-and-cutting tools according to claim 2, wherein when extruding super-hard metal powder into a spiral form, spiral coolant channels 21a and 21b are formed in the spiral from.

8. A method of making drills, endmills and other rotating-and-cutting tools according to claim 1 wherein the step of forming a ferrous metal powder layer around a part of the sintered spiral form 5 with its spiral groove 9 filled with the ferrous metal powder 6 includes the steps of:
   preparing a ferrous metal pipe 23 whose size is large enough to insert the sintered spiral form loosely;
   inserting a part of the sintered spiral form in the pipe;
   filling the spiral groove 9 of the part of the spiral sintered form and the annular space between the pipe 23 and the sintered spiral form 5 with a ferrous metal 6; and
   impregnating the packed ferrous metal with a brazing material M by capillary action;
   the step of heating and then cooling the ferrous metal powder layer to form a shank integrally connected to the spiral sintered body includes the steps of:
     heating the pipe and the part of the sintered spiral form at a temperature at which the brazing material will be melted, thereby melting and then solidifying the brazing material, whereby voids 20 are caused to appear inside to absorb any strain, which otherwise, would be caused by the difference between the thermal expansion or contraction of the shank material and that of the sintered spiral body.

9. A method of making drills, endmills and other rotating-and-cutting tools according to claim 8 wherein when extruding super-hard metal powder into a spiral form, spiral coolant channels 21a and 21b are formed in the spiral form, and the shank is brazed to the tool body without closing the inlets of the spiral coolant channels 21a and 21b.

* * * * *